May 26, 1970 — L. C. LYNNWORTH ET AL — 3,514,747
ULTRASONIC SENSING SYSTEM
Filed Oct. 25, 1968 — 2 Sheets-Sheet 1

INVENTOR
LAWRENCE C. LYNNWORTH
BRIAN J. SPENCER
BY
Kenway, Jenney & Hildreth
ATTORNEYS INVENTOR
LAWRENCE C. LYNNWORTH
BRIAN J. SPENCER
BY
Kenway, Jenney & Hildreth
ATTORNEYS

United States Patent Office 3,514,747
Patented May 26, 1970

---

3,514,747
ULTRASONIC SENSING SYSTEM

Lawrence C. Lynnworth, Waltham, and Brian J. Spencer, Billerica, Mass., assignors to Panametrics, Inc., Waltham, Mass., a corporation of Delaware
Filed Oct. 25, 1968, Ser. No. 770,614
Int. Cl. G01s 9/66
U.S. Cl. 340—1                                    9 Claims

ABSTRACT OF THE DISCLOSURE

Apparatus is disclosed for measuring the actual time interval between a preselected pair of ultrasonic echo pulses, which pulses occur at approximately known times following the generation of an interrogating acoustic pulse. The first of the preselected pulses operates means for starting a digital clock and the second or subsequent preselected pulse operates means for stopping the clock. The clock controlling means are disabled for respective preselected intervals following the generation of the interrogating pulse and following the reception of the first echo pulse so that the operation of the clock responds only to the preselected pair of pulses and not to other pulses.

BACKGROUND OF THE INVENTION

This invention relates to an ultrasonic sensing system and more particularly to such a system employing a plurality of sensors, each providing an acoustic delay which varies as a function of ambient conditions or parameters. The invention described herein was made in the performance of work under a NASA contract and is subject to the provisions of Section 305 of the National Aeronautics and Space Act of 1958, Public Law 85–568 (72 Stat. 435; 42 U.S.C. 2457).

In various ultrasonic sensing systems, it is advantageous to operate a plurality of sensors from a single transducer so as to reduce the amount of sensing equipment which must be introduced into the environment in which the sensing is to take place. Various dual ultrasonic sensors employing a common transducer are disclosed in copending applications Ser. Nos. 730,713 and 730,872, both of which were filed May 21, 1968. As is described in greater detail hereinafter and in the aforesaid copending applications, such dual sensors may produce a variety of echo pulses, the timing of which depends upon the lengths of the different sensors and the speed of acoustic wave propagation therethrough. In order to measure a given ambient condition or parameter, it is typically necessary to measure the time interval between a preselected pair of echo pulses, this interval being a function of the acoustic delay introduced by the corresponding sensor. While it is possible to identify the preselected pulses by also identifying and eliminating all other pulses, apparatus for providing the necessary programming is quite complex.

Among the several objects of the present invention may be noted the provision of apparatus for measuring the actual time interval between a preselected pair of echo pulses occurring in an ultrasonic sensing system employing a plurality of sensors; the provision of such apparatus in which pulses other than the preselected pair do not affect the measured time interval; the provision of such apparatus in which the pair selected may be easily varied; the provision of such apparatus providing measurements of high accuracy; and the provision of such apparatus which is reliable and relatively simple and inexpensive. Other objects and features will be in part apparent and in part pointed out hereinafter.

SUMMARY OF THE INVENTION

Briefly, apparatus of this invention is useful in an ultrasonic sensing system employing a plurality of sensors, each of which provides an acoustic delay which varies as a function of ambient conditions or parameters, the system also having means, including at least one ultrasonic transducer, for generating acoustic pulses to interrogate said sensors and for detecting echo pulses reflected back from the sensors. The apparatus includes clock means providing at least one A.C. signal of predetermined frequency, a counter and means including at least one gate for selectively coupling the clock means to the counter thereby to cause the counter to count the cycles of the A.C. signal when the gate is open. A first gate control means, when enabled, responds to echo pulses applied thereto for opening the gate and a second gate control means, when enabled, responds to echo pulses applied thereto for closing the gate. A first delay means enables the first gate control means after a first preselectable interval following the generation of an interrogating acoustic pulse. A second delay means enables the second gate control means after a second substantially preselectable interval following the opening of the gate. Accordingly, the gate is opened by a first echo pulse occurring after the first preselectable interval and is then reclosed by a subsequent echo pulse which follows the first echo pulse by an interval greater than the second preselectable interval. The count accumulated by the counter is thereby representative of the time interval between the first echo pulse and the subsequent echo pulse.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
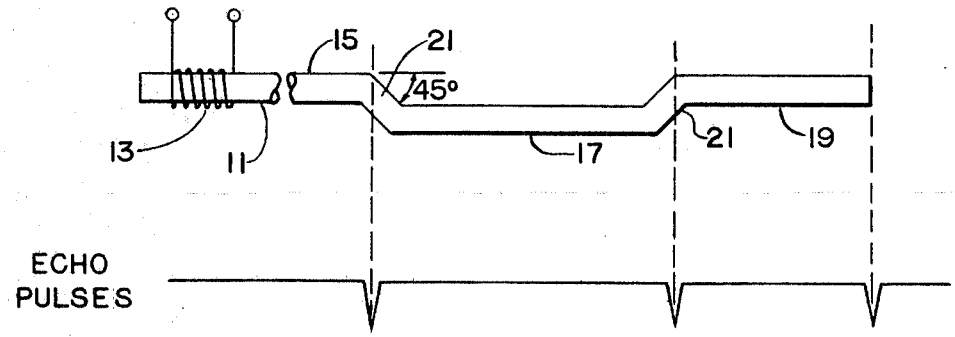
FIG. 1 is a somewhat diagrammatic view of a sensor probe including a pair of sensor elements which operate from a single transducer, together with a wave form diagram representing echo pulses produced by the probe.

Referring now to FIG. 1, the ultrasonic probe illustrated there is described in greater detail in the aforesaid copending application 730,713. However, for the purposes of the present invention it may be noted that this probe comprises a length of rod 11 of a magnetostrictive material. A coil 13 wound around one end of the rod thus enables that portion of the rod to function as a transducer. By applying an electrical pulse to winding 13, an acoustic pulse, e.g. in the extensional mode, may be transmitted along the rod.

The rod 11 comprises a lead-in section 15 and first and second sensor sections, 17 and 19 respectively, there being an offset or kink 21 between the different sections. The offsets act as discontinuities in the acoustic transmission path and, as such, cause echo pulses to be reflected back to the transducer. The end of the rod similarly constitutes a discontinuity which also produces an echo pulse. The echo pulses which are received by the transducer winding 13 are represented immediately below the sensor probe, each pulse being illustrated substantially in alignment with the corresponding discontinuity. The first of the echo pulses follows the interrogating pulse by an interval which varies as a function of the length of the lead-in section 15, and the next two pulses follow at time intervals which depend at least nominally upon the lengths of the corresponding probe section. Additional pulses may also be generated by multiple reflections within the probe sections.

As is understood by those skilled in the art, the exact delay introduced by each sensor section will vary in response to different ambient conditions. Thus, these ambient conditions or parameters can in turn be measured by measuring the exact time interval between the pair of echo pulses corresponding to the particular sensor.

The particular parameter or condition to which a given sensor is most sensitive can be selected by appropriate selection of sensor material. In the example illustrated, the probe is assumed to be a temperature sensing element and the material of portions 17 and 19 are selected to exhibit a substantial change in acoustic propagation velocity with temperature. Thus, the sensor sections 17 and 19 can be employed to measure or sense ambient temperature in adjacent regions, the delays introduced by each sensor section being then variable from their nominal values as functions of the average temperature along the corresponding sensor section.

Figure 2:
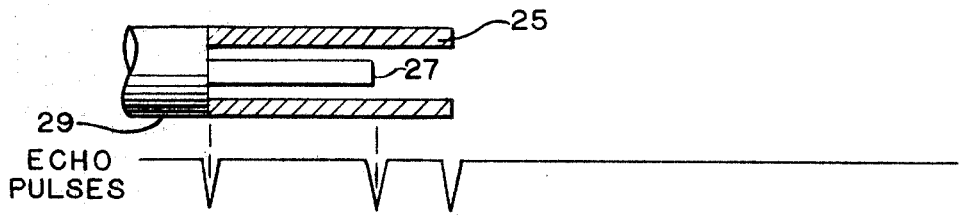
FIG. 2 is a view of another dual element sensor together with a corresponding wave form diagram.

FIG. 2 illustrates a coaxial sensor in which both a tubular sensor element 25 and a solid rod-like sensor 27 are attached in coaxial relationship to the end of an acoustic lead-in element 29. Preferably, the sensor elements 25 and 27 are constructed of different materials which respond to different ambient conditions. For example, the sensor element 25 may be constructed of a material in which the acoustic propagation velocity exhibits a substantial variation with variation in temperature while the sensor element 27 may be constructed of a material in which the propagation velocity varies significantly as a function of nuclear flux. The probe of FIG. 2 produces echo pulses substantially as represented immediately below the illustration of the probe itself and, as explained in greater detail in the aforesaid copending application Ser. No. 730,713, a measurement of the value of the respective sensed parameters e.g. temperature and nuclear flux, can be obtained by measuring the time intervals between corresponding pairs of the pulses. In other words, a selection of a particular pair of pulses permits selection of the particular sensor element from which a measurement is obtained.

Figure 3:
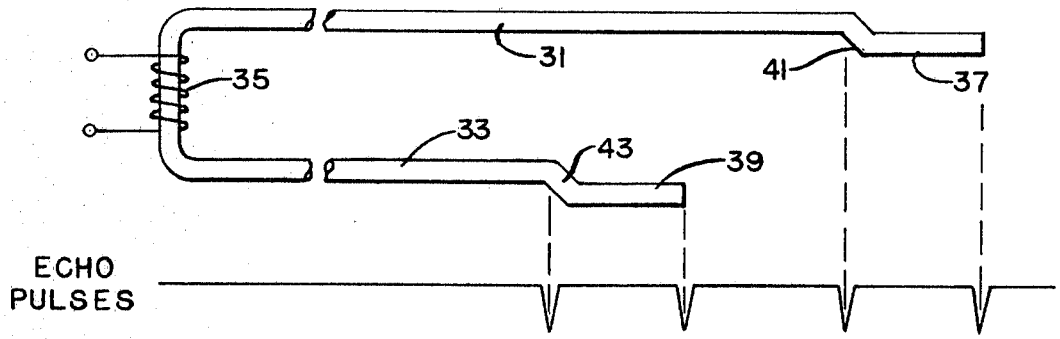
FIG. 3 is a view of a third dual element sensor with a corresponding wave form diagram.

FIG. 3 illustrates a sensing probe in which a pair of lead-in sections 31 and 33 extend from opposite sides of an ultrasonic transducer which includes a winding 35. At the end of each lead-in 31 and 33, a respective sensor element 37 and 39 is defined by a corresponding offset, 41 and 43 respectively. These offsets constitute acoustic discontinuities in the manner described previously with reference to FIG. 1. As is understood by those skilled in the art, a transducer such as that indicated at 35, emits acoustic energy from both ends simultaneously. Thus, when the winding 35 is energized by an electrical pulse, acoustic pulses will be transmitted down both lead-ins 31 and 33.

When the sensor elements 37 and 39 are interrogated by the incident acoustic energy, echo pulses will be produced by the discontinuities which constitute the ends of each sensor element. The echo pulses received by the transducer winding 35 are again represented immediately below in the representation of the probe, each pulse being shown substantially in alignment with the corresponding sensor discontinuity. Assuming that the material of the sensor elements 37 and 39 is responsive to temperature, the ambient temperatures around each element may be measured by measuring the interval or delay between the pair of echo pulses corresponding to the particular sensor and the selection of which temperature is being measured may be made by selecting which pair of pulses are considered.

With each of the multi-sensor probes illustrated in FIGS. 1–3, it can be seen that a given parameter sensed by one of the sensor elements can be measured by measuring the time interval between a corresponding pair of pulses. It can further be seen that each of the sensors generates other echo pulses which must be disregarded in the measuring of the selected parameter. The timing of the different pulses is, however, known approximately or nominally from the dimensions and materials employed in constructing the probe, and the information which reveals the value of the sensed parameter is contained in the variation of the exact value of each delay from its nominal value. The apparatus illustrated in FIG. 4 employs this approximately known time to select the particular echo pulses which are needed to obtain the desired exact measurement.

Figure 4:
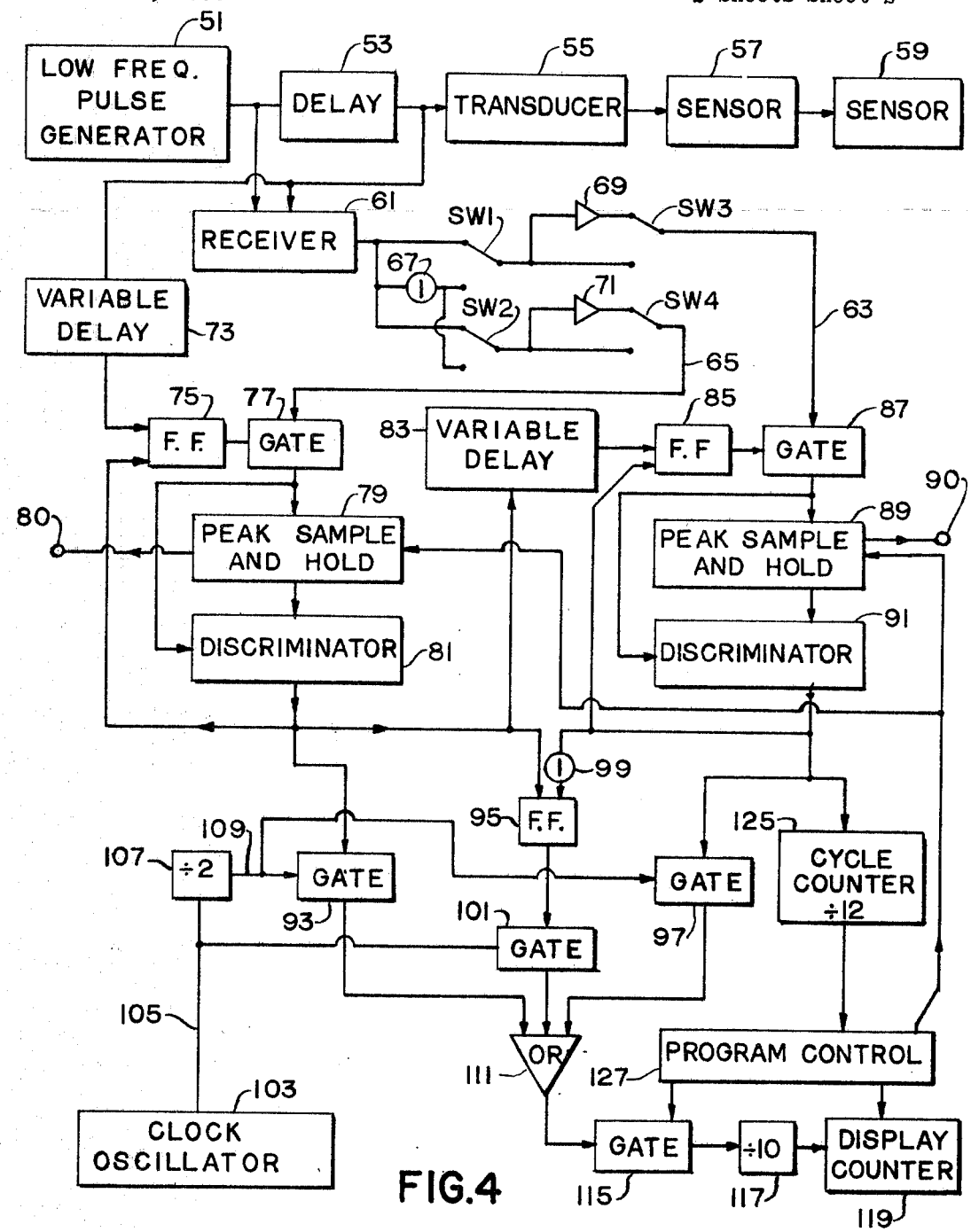
FIG. 4 is a block diagram of apparatus of the present invention for measuring the time interval between a preselected pair of a plurality of echo pulses such as the multiple echo pulses provided by the sensors of FIGS. 1–3.

Referring now to FIG. 4, a low frequency pulse generator 51 is provided for timing the generation of interrogating acoustic pulses. Pulses provided by generator 51 are applied, through an element 53 which provides a short delay, to a transducer 55. The transducer 55 may for example comprise the winding 13 of FIG. 1. Transducer 55 is acoustically coupled to a pair of sensor elements 57 and 59 which may, for example, comprise the sensor sections 17 and 19 of the probe of FIG. 1. The transducer 55 is also electrically coupled to a receiver 61 which is operative to detect echo pulses reflected from the sensors 57 and 59. The undelayed pulse signal provided by generator 51 is also applied to receiver 61 as an inhibit signal to prevent the receiver from responding to or being overloaded by the interrogating pulse.

Echo pulses detected by the receiver 61 are provided to a pair of leads 63 and 65. A pair of switches SW1 and SW2 permit the signals applied to leads 63 and 65 to be taken either directly from the receiver or through an inverter 67 so that the pulses supplied to the leads will be of proper polarity to correctly operate the following circuitry. Similarly, a pair of switches SW3 and SW4 permit the amplitudes of the signals to be either adjusted or not adjusted by means of respective amplifiers as indicated at 69 and 71. As is explained in the aforesaid copending applications, the echo pulses reflected back from ultrasonic sensors may be of different amplitudes and polarities depending upon the acoustic impedances of the materials employed. The switches SW1–SW4 permit any of various possible combinations of desired pulses to be utilized by this apparatus.

The interrogating pulse signal which is applied to the transducer 55 is also applied to an element 73 which is operative to provide a preselectable delay, which delay can be varied over a substantial range. Element 73 may, for example, comprise a monostable or single shot multivibrator. The output signal provided by the delay element 73 is applied to one of the inputs of a flip-flop circuit 75 which in turn controls a gate 77. Gate 77 is operative to selectively apply the echo pulse signal available at line 65 to a gated sample and hold circuit 79 and a discriminator circuit 81. The sample and hold circuit 79, when gated on, utilizes the pulse signals applied thereto and is operative to sample the amplitudes of echo pulses applied thereto through gate 77 and to provide a voltage substantially equal to the peak amplitude of the echo pulses. This peak voltage is applied to discriminator 81.

Discriminator 81 operates to compare the echo pulse signal passed by gate 77 with the peak voltage provided by the sample and hold circuit 79 and to provide a sharply switched output voltage when the echo pulse signal exceeds a preselected portion, e.g. 70%, of the peak voltage. Accordingly, the output signal from discriminator 81 is a square wave signal in which each square wave pulse has a duration substantially equal to the duration of that portion of the corresponding echo pulse which is above 70% of the peak amplitude. In other words, the peak sample and hold circuit 79 and the discriminator 81 together operate as a squaring circuit for selected echo pulse signals passed by gate 77. The output signal from the discriminator 81 is applied to the other input of flip-flop circuit 75 so that the gate 79 is closed at the trailing edge of each square wave output pulse.

The output signal from discriminator 81 is also applied to a circuit element 83 which provides a preselectable delay in the manner described previously with reference to the variable delay element 73. The output signal from delay element 83 is applied to one of the inputs of a flip-flop circuit 85 which controls a gate 87, the signal being applied so that the gate 87 is opened at the end of the delay provided by the circuit element 83.

Gate 87 controls the application of the echo pulse signal available at lead 63 to a peak sample and hold circuit 89 and a discriminator 91 which are substantially identical with the circuit elements 79 and 81 described previously and which utilize echo pulse signals applied thereto in similar manner. In other words, these elements operate to "square" selected echo pulses passed by the gate 87. The square wave output signal provided by discriminator 91 is applied to the other input of flip-flop 85 so as to close the gate 87 at the trailing edge of each square wave output pulse.

The peak amplitude signal provided by the peak sample and hold circuits 79 and 89 are also provided at respective output terminals 80 and 90 so that amplitude and attenuation measurements of the selected pulses may be made. The square wave output signal provided by discriminator 81 directly controls a gate 93 and is also applied to one of the input terminals of a flip-flop 95. The square wave output signal provided by the discriminator 91 directly controls a gate 97 and is also applied, through an inverter 99, to the other input terminal of flip-flop 95. The output signal from flip-flop 95 controls a gate 101.

A clock oscillator 103 provides, at a lead 105, an A.C. signal at a predetermined, fixed frequency e.g. 10 megahertz. The signal provided at lead 105 is applied to a binary counter 107 which provides, at a lead 109, an A.C. signal at a frequency which is half that provided at the lead 105, e.g. 5 megahertz. As is described in greater detail hereinafter, the A.C. signals provided at leads 105 and 109 function as clock signals which establish a time base for timing the intervals between echo pulses. Gates 93 and 97 control the application of the lower frequency A.C. signal from lead 109 to respective inputs of an OR gate 111 while the gate 101 controls the application of the higher frequency signal from lead 105 to a third input of OR gate 111. The output signal from the OR gate 111, which comprises the sum of the various gated clock signals applied thereto, is selectively passed by a gate 115 to a divide-by-10 117 which in turn drives a display counter 119. The oscillator 103, the counters 117 and 119 and the various gates controlling the clock signals can thus be seen to comprise a digital clock.

The square wave output signal provided by discirminator 91 is also applied to a counter 125 which has 12 distinct states. Counter 125 in turn times the operation of a program control circuit 127 which, as will be explained in greater detail hereinafter, controls the sequence of operations of the apparatus of FIG. 4 following successive sensor interrogation pulses. In particular, the program control circuit 127 controls: the gating of the peak sample and hold circuits 79 and 89; the operation of the gate 115 which controls the application of the clock signals to the counters 117 and 119; and the resetting of the counter 119.

The operation of this apparatus is substantially as follows. The preselectible delay provided by element 73 is adjusted so as to be slightly shorter than the nominal interval between the interrogating pulse and the first of the preselected pair of echo pulses. Similarly, the preselectable delay provided by element 83 is adjusted so as to be slightly shorter than the nominal interval between the two echo pulses which constitute the preselected pair. Accordingly, following the generation of an interrogating pulse, the gate 77 is opened just in time to admit the first of the preseleced echo pulses to the peak sample and hold circuit 79. The trailing edge of the resultant square wave signal provided by discriminator 81 then resets of the flip-flop 75 closing gate 77 so that this portion of the circuitry is no longer responsive to received echo pulses.

The trailing edge of the square wave pulse provided by discriminator 81 also triggers the variable delay circuit 83. Delay circuit 83 in turn, by triggering the flip-flop 85, opens the gate 87 just in time to admit the second of the preselected pair of pulses to the peak sample and hold circuit 89. The trailing edge of the resultant square wave pulse provided by discriminator 91 then resets the flip-flop 85 thereby closing the gate 87 so that this portion of the circuitry also is then no longer sensitive to received echo pulses. From the foregoing, it can be seen that the peak sample and hold circuits 79 and 89 and the discriminators 81 and 91 are activated only by respective ones of the preselected pulses. If desired, feedback control may be applied to vary the delay applied so as to keep the time of opening of the respective gates close to the time of the respective selected pulse.

The square wave signals provided by discriminator 91 also advance the cycle counter 125 which drives the program control network 127. The operation of the program control network 127 is such that the peak sample and hold circuits 79 and 89 are gated into operation or activated only during the first two cycles in the overall sequence of 12 interrogation cycles. Thus, during the first two cycles, the circuits 79 and 89 sample the respective echo pulses and provide a signal representative of the peak amplitudes of those pulses. Accordingly, during the next 10 interrogation cycles, the discriminators 81 and 91 provide square wave output signals having durations equal to the portion of time which the respective echo pulses exceed a predetermined portion of the previously established peak amplitude. As will be apparent hereinafter, these square wave signals are taken as defining the durations of the respective echo pulses.

The square wave signal provided by discriminator 81 opens the gate 93 for the duration of the respective preselected echo pulse, thereby causing the half frequency signal from lead 109 to be applied to the OR gate 111 during this interval. At the end of this interval, i.e. at the trailing edge of the square wave pulse provided by discriminator 81, the flip-flop 95 is triggered, opening the gate 101. The opening of gate 101 allows the full frequency A.C. signal provided by oscillator 103 to be applied to the OR gate 111.

The square wave output signal from discriminator 91, being applied to the other input of flip-flop 95 through inverter 99, causes the flip-flop to close gate 101 at the leading edge of the square wave signal provided by discriminator 91, i.e. at the beginning of the second of the preselected echo pulses. Simultaneously, this leading edge of the square wave pulse provided by discriminator 91 opens the gate 97 so that the half frequency signal provided at lead 109 is then applied to the OR gate 111. It can thus be seen that the output signal from the OR gate 111 comprises the half frequency clock signal for the duration of the first preselected echo pulse; the full frequency clock signal from the end of the first of the preselected pulses to the beginning of the second preselected pulse;

and the half frequency clock signal again for the duration of the second preselected echo pulse.

The program control network 127 controls the gate 115 so that the output signal from the OR gate 111 is applied to the counters 117 and 119 for the last ten interrogation cycles in each full sequence of the cycle counter 125. Since the display counter 119 is preceded by the divide-by-ten counter 117, it will be understood that the count displayed will thus represent the average of the counts taken over the ten interrogation cycles. Further, since the counting is based on the half frequency signal for the whole duration of each of the echo pulses, it will be understood by those skilled in the art that the count displayed will be substantially equal to that which would occur if the measurement were taken between the center lines of the square wave signals defining the echo widths. In practice, this time closely corresponds to the time from the exact peak of the first of the preselected echo pulses to the exact peak of the second preselected echo pulse. In a broad sense then, the output signal from the discriminator 81 starts the digital clock and the output signal from discriminator 91 stops the clock.

From the foregoing, it can be seen that the count displayed by counter 119 is a highly accurate measurement of the time interval between a preselected pair of pulses and that the particular pulses which are preselected can be easily changed by appropriately preselecting the delays provided by the variable delay elements 73 and 83. Thus the apparatus of FIG. 4 can be used with any one of the sensors of FIGS. 1–3 to measure a desired sensor delay interval, without being affected by the various other pulses which are present in the transducer signal, and different sensor elements within a given one of the probes can be selected by appropriately selecting the nominal delays which select the pair of pulses between which the time interval is measured. For example, when using this apparatus with the probe as illustrated in FIG. 3, the delay provided by element 73 can be adjusted to correspond to the length of whichever one of the lead-in portions 31 or 33 extends to the preselected sensor.

Thus the delay provided by the selected sensor, and hence also the parameters sensed thereby, can be measured. Similarly, when using this apparatus with the probe of FIG. 2 where the first pulse is common to both of the sensors, the choice of which sensor is being utilized can be made by appropriately preselecting the delay provided by the element 83 so that the corresponding pulse terminates the operation of the digital clock. In using this apparatus with the probe of FIG. 1, it can be seen that both delays must be appropriately selected to choose the two pulses which correspond to the preselected sensor element.

Figure 5:
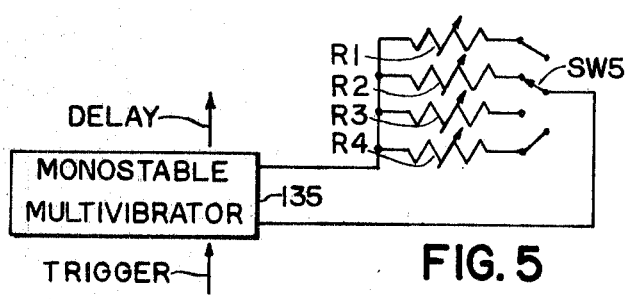
FIG. 5 is a diagram of switch means for selecting one of a plurality of sensors in the apparatus of FIG. 4.

If desired, a plurality of delays, each of which corresponds to a respective sensor, may be preselected, e.g. by means of respective potentiometers $R_1$–$R_4$ which control the time constant of a monostable multivibrator 135 as illustrated in FIG. 5. Then a given sensor may be selected by means of a simple switch SW5 which selects a corresponding one of the potentiometers. Preferably, the switch is labeled to indicate the corresponding sensor so that selection is facilitated.

In addition to facilitating the selection of different sensors where the sensor elements are physically discrete as in the probes of FIGS. 1–3, the apparatus of FIG. 4 may also be used to select between different sensed parameters in a probe in which ultrasonic pulses are transmitted in different modes and the different modes experience correspondingly different delays. For example, a Joule-Weidemann transducer generates both torsional waves and extensional waves. The velocity of the torsional waves depends upon the shear modulus of the sensor material and the velocity of the extensional waves depends upon the Young's modulus of the sensor material. Accordingly, ambient conditions which affect these parameters differently may be sensed with a single sensor element.

Similarly, this apparatus may be utilized to select particular information bearing pulses in a system in which transducers are employed at both ends of a probe assembly and the desired information is provided by a combination of reflected and through-transmitted signal pulses.

The apparatus of FIG. 4 also facilitates the selection of particular pulses in a series of pulses in systems in which the desired information is represented by the amplitudes of the selected pulses, this information being provided at the terminals 80 and 90 which provide signals representing the peak amplitudes of the respective pulses and thus permit attenuation measurements.

A still further application of the apparatus of FIG. 4 is in effectively increasing the magnitude of the measured delay and thereby increasing the sensitivity of measurement of the sensed parameter. As mentioned previously, an ultrasonic pulse may undergo multiple interval reflections within a single sensor element. By choosing an appropriate pair of pulses in the sequence of pulses generated, the measurement obtained can reflect the delay or attenuation resulting from a plurality of passes through the sensor element and thus the effect of the sensed parameter or ambient condition is greatly amplified so that a more accurate measurement is obtained.

In view of the above, it will be seen that several objects of the present invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an ultrasonic sensing system having at least one sensor providing at least one acoustic delay which varies as a function of a respective ambient condition and also having means, including at least one ultrasonic transducer, for generating acoustic pulses to interrogate said sensor and for detecting signal pulses provided by said sensor; apparatus for measuring the actual time interval between a preselected pair of said signal pulses, which preselected pulses occur at approximately known times following the generation of an interrogating acoustic pulse, said apparatus comprising:

clock means providing at least one A.C. signal of predetermined frequency;

a counter;

means, including at least one gate, for selectively coupling said clock means to said counter thereby to cause said counter to count the cycles of said A.C. signal when said gate is open;

a first gate control means which, when enabled, is responsive to signal pulses applied thereto for opening said gate;

a second gate control means which, when enabled, is responsive to signal pulses applied thereto for closing said gate;

first delay means for enabling said first gate control means after a first preselectable interval following the generation of an interrogating acoustic pulse; and second delay means for enabling said second gate control means after a second substantially preselectable interval following the opening of said gate whereby said gate is opened by a first signal pulse occurring after said first preselectable interval and is reclosed by a subsequent signal pulse which follows said first signal pulse by an interval greater than said second preselectable interval, the count accumulated by said counter being thereby representative of the delay between said first signal pulse and said subsequent signal pulse.

2. In an ultrasonic sensing system having a plurality of sensors and means, including at least one ultrasonic transducer, for generating acoustic pulses to interrogate said sensors and for detecting echo pulses reflected back from said sensors, each of said sensors providing at least a pair of echo pulses having a delay therebetween which varies as a function of ambient conditions, each pair of pulses occurring at a respective, approximately known time following the generation of an interrogating acoustic pulse; apparatus for measuring the time interval between a pair of echo pulses corresponding to a preselected one of said sensors, said apparatus comprising:

clock means providing at least one A.C. signal of predetermined frequency;

a counter;

means, including at least one gate, for selectively coupling said clock means to said counter thereby to cause said counter to count the cycles of said A.C. signal when said gate is open;

a first gate control means which, when enabled, is responsive to a received echo pulse for opening said gate;

delay means for enabling said first gate control means after a preselectable interval following the generation of an interrogating acoustic pulse; and a second gate control means responsive to echo pulse received after the opening of said gate for closing said gate whereby said gate is opened by a first echo pulse occurring after said preselectable interval and is reclosed by a subsequent echo pulse, the count accumulated by said counter being thereby representative of the delay between said first echo pulse and said subsequent echo pulse, and whereby the pair of pulses corresponding to said preselected sensor may be selected by adjustment of said preselectable interval.

3. Apparatus as set forth in claim 2 wherein said delay means includes switch means for selecting one of a plurality of predetermined delays, each of which corresponds to the nominal delay between said interrogating pulse and the first of the pair of echo pulses provided by a respective sensor, whereby selection of a particular sensor is made by setting said switch means.

4. In an ultrasonic sensing system having a plurality of sensors and means, including at least one ultrasonic transducer, for generating acoustic pulses to interrogate said sensors and for detecting echo pulses reflected back from said sensors, each of said sensors providing a respective delayed pulse following a common initial echo pulse, the respective delay being variable from a nominal value as a function of ambient conditions; apparatus for measuring the time interval between said initial echo pulse and the delayed pulse corresponding to a preselected one of said sensors, said apparatus comprising:

clock means providing at least one A.C. signal of predetermined frequency;

a counter;

means, including at least one gate, for selectively coupling said clock means to said counter thereby to cause said counter to count the cycles of said A.C. signal when said gate is open;

a first gate control means responsive to said initial echo pulse for opening said gate;

a second gate control means which, when enabled, is responsive to a received echo pulse for closing said gate; and delay means for enabling said second gate control means after a preselectable interval following said initial echo pulse whereby said gate is opened by said initial echo pulse and is reclosed by a subsequent echo pulse occurring after said preselectable interval, the count accumulated by said counter being thereby representative of the delay between said initial echo pulse and said subsequent echo pulse, and whereby the delayed pulse corresponding to said preselected sensor may be selected by adjustment of said preselectable interval.

5. Apparatus as set forth in claim 4 wherein said delay means includes switch means for selecting one of a plurality of predetermined delays, each of which corresponds to the nominal delay provided by a respective sensor, whereby selection of a particular sensor is made by setting said switch means.

6. Utrasonic sensing apparatus comprising:

at least one sensor;

means, including at least one ultrasonic transducer, for generating acoustic pulses to interrogate said sensor and for detecting signal pulses provided by said sensor;

a first signal pulse utilization means;

a first gate for controlling the application of signal pulses to said first utilization means;

a second signal pulse utilization means;

a second gate for controlling the application of signal pulses to said second utilization means;

first delay means for opening said first gate after a first preselectable interval following the generation of an interrogating acoustic pulse; and second delay means for opening said second gate after a second, substantially preselectable interval following the opening of said first gate whereby a first signal pulse occurring after said first preselectable interval is applied to said first utilization means and a subsequent signal pulse which follows said first signal pulse by an interval approximately said second preselectable interval is applied to said second utilization means.

7. Apparatus as set forth in claim 6 wherein said first pulse utilization means initiates a timing interval in response to a pulse applied thereto and wherein said second pulse utilization means terminates said timing interval.

8. Apparatus as set forth in claim 7 including means for registering the duration of said timing interval.

9. Ultrasonic sensing apparatus comprising:

a plurality of sensors, each providing an acoustic delay which varies as a function of ambient conditions;

means, including at least one ultrasonic transducer, for generating acoustic pulses to interrogate said sensors and for detecting echo pulses reflected back from said sensors;

clock means providing at least one A.C. signal of predetermined frequency;

a counter;

a first gate for selectively coupling said clock means to said counter thereby to cause said counter to count the cycles of said A.C. signal when said first gate is open;

a first control means responsive to echo pulses applied thereto for opening said first gate;

a second gate for controlling the application of echo pulses to said first control means;

a second control means responsive to eacho pulses applied thereto for closing said first gate;

a third gate for controlling the application of echo pulses to said second control means;

first delay means for opening said second gate after a first preselectable interval following the generation of an interrogating acoustic pulse; and second delay means for opening said third gate after a second substantially preselectable interval following the opening of said first gate whereby; said first gate is opened by a first echo pulse occurring after said first preselectable interval and is reclosed by a subsequent echo pulse which follows said first echo pulse by an interval greater than said second preselectable interval, the count accumulated by said counter being thereby representative of the delay between said first echo pulse and said subsequent echo pulse.

(References on following page)

References Cited

UNITED STATES PATENTS

| | | | |
|---|---|---|---|
| 2,949,973 | 8/1960 | Broding et al. | 181—.5 |
| 3,075,189 | 1/1963 | Lisicky | 343—7.3 |
| 3,087,140 | 4/1963 | O'Neill | 340—38 |
| 3,137,169 | 6/1964 | Clement et al. | 73—339 |
| 3,339,403 | 9/1967 | Barnes | 73—67.9 |

FOREIGN PATENTS

| | | |
|---|---|---|
| 986,416 | 3/1965 | Great Britain. |

OTHER REFERENCES

Cooke, The Radio & Elec. Engineer, June 1967, pp. 353–360.

RICHARD A. FARLEY, Primary Examiner

U.S. Cl. X.R.

73—339